United States Patent [19]

Baxi et al.

[11] Patent Number: 5,049,056
[45] Date of Patent: Sep. 17, 1991

[54] GAS SUPPLY SPRUE BUSHING FOR INJECTION MOLDING MACHINES

[75] Inventors: Indra R. Baxi, Solon, Ohio; Paul Pardy, Windsor, Canada

[73] Assignee: Nitrojection Corporation, Middlefield, Ohio

[21] Appl. No.: 493,909

[22] Filed: Mar. 14, 1990

[51] Int. Cl.⁵ .............................................. B29C 45/16
[52] U.S. Cl. .................... 425/130; 264/572; 425/197; 425/562; 425/564; 425/573
[58] Field of Search ............... 425/130, 197, 562, 563, 425/564, 570, 571, 573; 264/572

[56] References Cited

U.S. PATENT DOCUMENTS

| | | | |
|---|---|---|---|
| 4,474,717 | 10/1984 | Hendry | 425/812 |
| 4,781,554 | 11/1988 | Hendry | 425/130 |
| 4,824,732 | 4/1989 | Hendry et al. | 425/546 |
| 4,855,094 | 8/1989 | Hendry | 425/568 |

OTHER PUBLICATIONS

4 Drawings of a Sprue Body, One dated 6-21-83 and One dated 1-23-84.

Primary Examiner—Timothy Heitbrink
Attorney, Agent, or Firm—Fay, Sharpe, Beall, Fagan, Minnich & McKee

[57] ABSTRACT

A bushing used in an injection molding machine and positioned between the nozzle and the sprue thereof includes an adaptor body having a longitudinal axis, a first end and a second end. A first bore extends in the adaptor body parallel to the longitudinal axis from the second end to the first end for accommodating a flow of relatively viscous fluid such as a molten thermoplastic. A bridge extends transversely across the first bore between opposing walls of the bore adjacent the adaptor body first end. Fluid flow is allowed through the first bore around the bridge. A second bore extends from a surface of the adaptor body to a surface of the bridge for accommodating a flow of a relatively non-viscous fluid such as gas. The second bore terminates on the bridge surface so as to be substantially coaxial with the first bore.

20 Claims, 3 Drawing Sheets

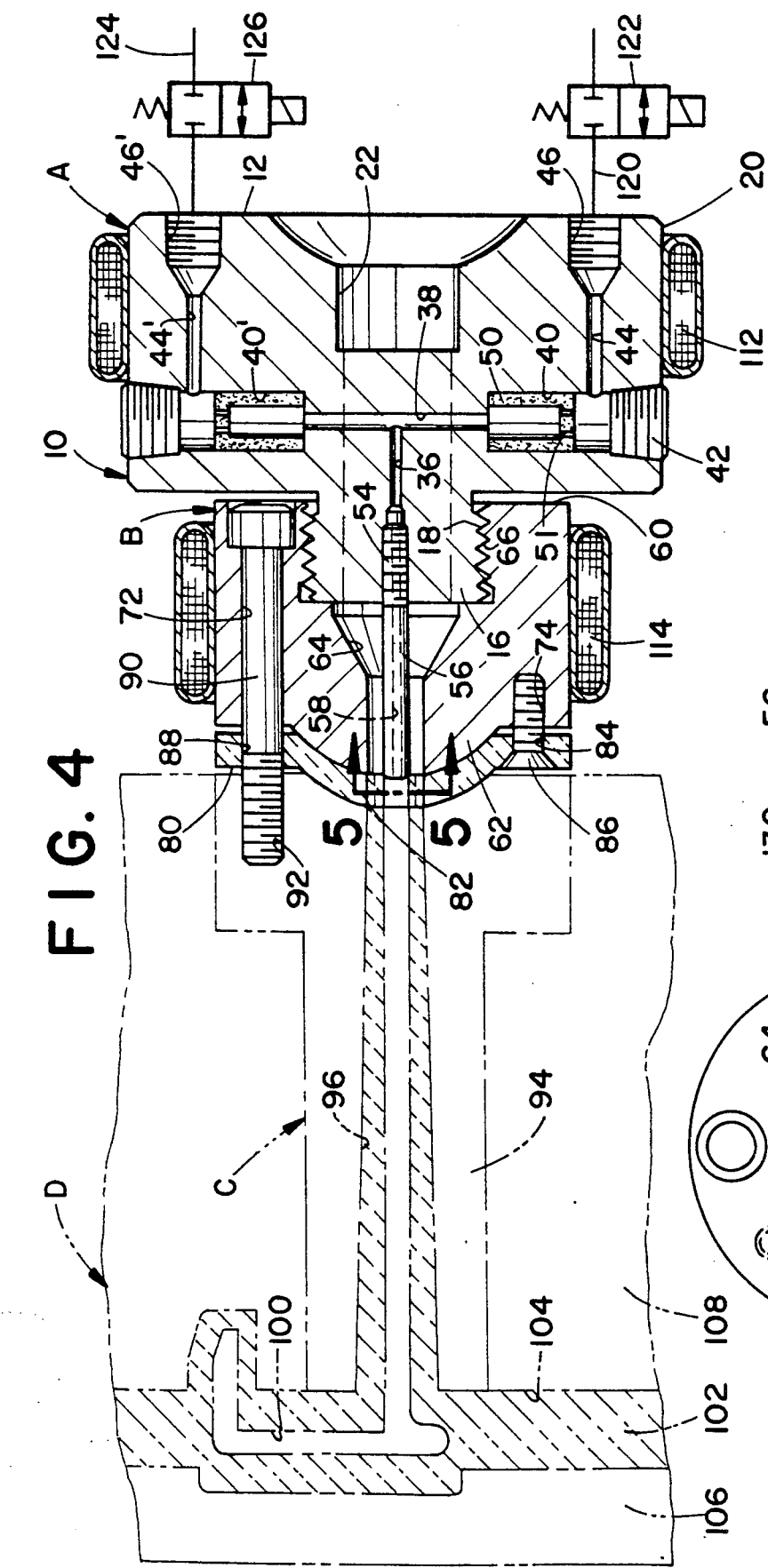
FIG. 4
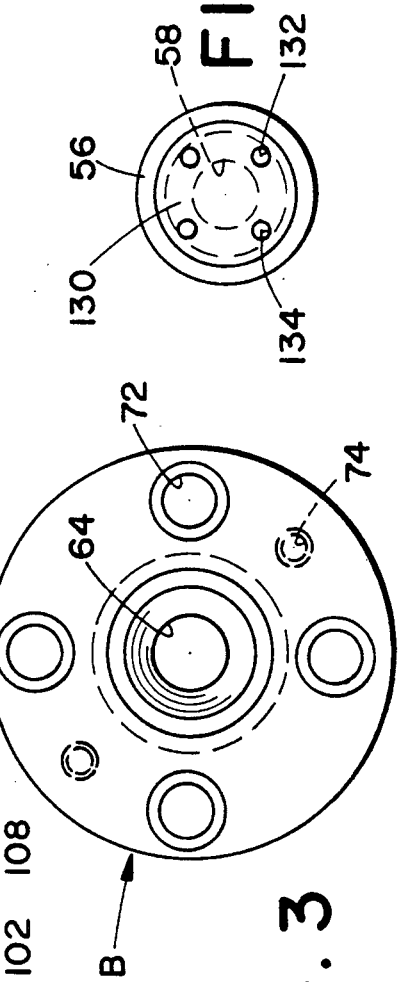
FIG. 5
FIG. 3

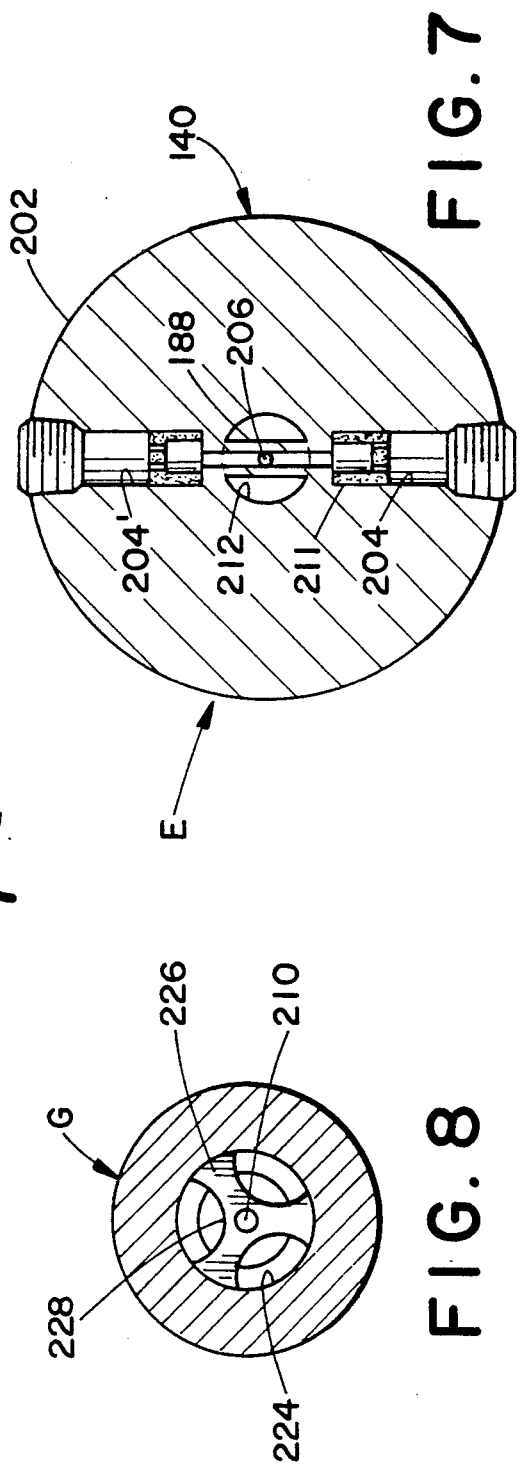

GAS SUPPLY SPRUE BUSHING FOR INJECTION MOLDING MACHINES

BACKGROUND OF THE INVENTION

This invention generally pertains to an injection molding apparatus. More specifically, the present invention relates to a sprue bushing utilized in such an injection molding apparatus.

The invention is particularly applicable to a nozzle used in the injection of a relatively viscous fluid, such as a molten thermoplastic, and a relatively non-viscous fluid, such as a gas, into an injection mold during a process known as gas-augmented or gas-assisted injection molding. However, it will be appreciated to those skilled in the art that the invention has broader applications and may also be adapted for use in other injection molding environments where both a relatively viscous fluid, such as a plastic or wax, and a relatively non-viscous fluid, such as a gas, steam or liquid, are injected into a mold cavity.

Gas assisted injection molding processes are becoming widely known in the art. Such processes employ the steps of injecting a plasticized (melted) thermoplastic material under high pressure into a finite mold space but to a volume less than 100% of the mold space. Thereafter, an inert gas is injected under pressure into the plasticized material in order to fill the rest of the volume in the mold cavity. The gas enters the plasticized material and moves along the paths of least resistance therein. Such paths are normally in areas where the thermoplastic body is thicker and has slower cooling sections such as ribs, flow channels, chamfers, etc. In this way, with a suitably designed part, a continuous network of hollowed sections can be provided. The material displaced by the gas from the middle of the sections moves out to fill the remainder of the mold space. This network of gas channels provides a uniform pressure distribution system throughout the mold space during hardening and cool down of the molded part thus minimizing internal stresses. The outer surfaces of the thicker sections do not display sink marks because gas has cored them out from the inside and gas pressure holds the plastic material up against the mold surfaces during hardening. Sink in these sections takes place internally rather than on the exterior surfaces of the part. Since the pressure used for final filling of the part is confined to an area defined by the gas channels, the resultant force against the sections of the mold is relatively modest so that lower clamping forces on the mold are adequate.

Several types of such nozzles are known to the art. However, one disadvantage with such nozzles is the fact that they cannot be retrofitted onto a conventional plastic injection molding machine (i.e. of the non-gas assisted type) without extensive modifications. Also, most of the nozzles which are adapted to inject both a thermoplastic material and a gas into a mold cavity do not allow the discharge of the gas or other relatively non-viscous fluid back through the nozzle when such discharge is required. Instead, in these nozzle systems, the nozzle needs to be spaced away from the mold body in order to vent the gas out of the mold cavity. Those nozzles which are said to be adapted to vent the gas back through the nozzle are unsatisfactory because molten plastic, which remains in the nozzle or in the sprue of the mold body, is frequently vented back along with the gas. This can be deleterious to the gas lines in the nozzle and to the gas piping and valves downstream from the nozzle. Also, if such plastic solidifies in the gas lines in the nozzle, the nozzle becomes unusable until it is cleaned out, which is time consuming, difficult, and expensive.

Accordingly, it has been considered desirable to develop a new and improved injection molding machine sprue bushing and bushing and nozzle construction which would overcome the foregoing difficulties and others while providing better and more advantageous overall results.

BRIEF SUMMARY OF THE INVENTION

In accordance with the present invention, a new and improved bushing, used in an injection molding machine and positioned between a nozzle and a sprue thereof, is provided.

More particularly in accordance with this aspect of the invention, the bushing comprises an adaptor having a longitudinal axis, a first end, and a second end. A first bore extends in the adaptor body parallel to the longitudinal axis from the second end to the first end of the body for accommodating a flow of a relatively viscous fluid such as a molten thermoplastic. A bridge extends transversely across the first bore between opposing walls of the bore adjacent the adaptor body first end. Fluid flow is allowed through the first bore around the bridge. A second bore extends from the surface of the adaptor body to a surface of the bridge for accommodating a flow of a relatively non-viscous fluid such as a gas. The second bore terminates on the bridge surface so as to be substantially coaxial with the first bore.

In accordance with another aspect of the invention, a bushing is provided that is used in an injection molding machine and adapted to be positioned between a sprue and a nozzle thereof.

More particularly in accordance with this aspect of the invention, the bushing comprises an adaptor body having a longitudinal axis, a front end, a rear end, and an exterior periphery. The adaptor body comprises a first bore which extends parallel to the longitudinal axis from the rear end to the front end for accommodating a relatively viscous fluid such as molten thermoplastic. A bridge extends transversely across the first bore between opposing walls of the bore adjacent the body front end. Fluid flow is allowed through the first bore around the bridge. A second bore extends from a surface of the bridge to the body exterior periphery for accommodating a relatively non-viscous fluid such as a gas. An insert body having a front end and a rear end is also provided. A third bore extends longitudinally through the insert body with the third bore being in fluid communication with the first bore. A securing means is provided for securing the insert body rear end to the adaptor body front end.

In accordance with still another aspect of the present invention, a nozzle is provided for an injection molding machine.

More particularly in accordance with this aspect of the invention, the nozzle comprises a nozzle body having a longitudinal axis, an inlet end, a discharge end, and a flow passage for a relatively viscous first fluid such as a molten thermoplastic extending along the longitudinal axis from the inlet end to the discharge end. A valve element is mounted for reciprocation in the nozzle body flow passage to control the flow of the first fluid through the nozzle body discharge end. Also provided is an adaptor body having a rear end secured to the nozzle body discharge end, and a front end. The adaptor body comprises a first bore which extends longitudinally in the adaptor body from the rear end to the front end with the first bore being in fluid communication with the nozzle body flow passage to accommodate a flow of the first fluid. A bridge extends transversely across the first bore between opposing walls of the bore adjacent the adaptor body front end. Flow of the first fluid is allowed through the first bore around the bridge. A second bore extends from a surface of the bridge to an outer periphery of the adaptor body for accommodating a flow of a relatively non-viscous fluid such as a gas. The second bore terminates on a surface of the bridge so as to be coaxial with the first bore.

One advantage of the present invention is the provision of a new and improved sprue bushing which can be utilized in an injection molding nozzle.

Another advantage of the present invention is the provision of a sprue bushing which is thermally isolated from its adjacent sprue.

Still another advantage of the present invention is the provision of a sprue bushing which has both a relatively non-viscous fluid flow passage and a relatively viscous fluid flow passage extending therethrough so that the fluid flow passages terminate in such a manner as to be coaxial.

Yet another advantage of the present invention is the provision of a sprue bushing which is provided with a plurality of different relatively non-viscous fluid passages so that fluids having two different viscosities can flow therethrough.

A further advantage of the present invention is the provision of a sprue bushing having a relatively non-viscous fluid flow passage therein, the passage being so adapted as to be able to house a filter member for filtering the non-viscous fluid.

A still further advantage of the present invention is the provision of a sprue bushing having a tube secured at one end thereto so that the tube is in fluid communication with a relatively non-viscous fluid flow passage in the sprue bushing.

A yet further advantage of the present invention is the provision of a bushing assembly including an adaptor body and an associated insert body which is secured to the adaptor body as well as to an associated sprue.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein:

FIG. 3 is a front elevational view of an insert body utilized with the adaptor body of FIG. 1;

FIG. 4 is a side elevational view in cross section of the adaptor body and insert body of FIGS. 1 and 3, respectively, along line 4—4 of the adapter body together with associated apparatus;

FIG. 5 is a greatly enlarged front elevational view of an extension tube secured at one end to the adaptor body of FIG. 4;

FIG. 6 is a side elevational view in cross section of an adaptor body and a nozzle used therewith according to an alternate embodiment of the present invention;

FIG. 7 is an enlarged cross sectional view through the adaptor body and nozzle of FIG. 6 along line 7—7; and, FIG. 8 is an enlarged cross sectional view of FIG. 6 along line 8—8.

DETAILED DESCRIPTION OF THE PREFERRED AND ALTERNATE EMBODIMENTS

Figure 1:
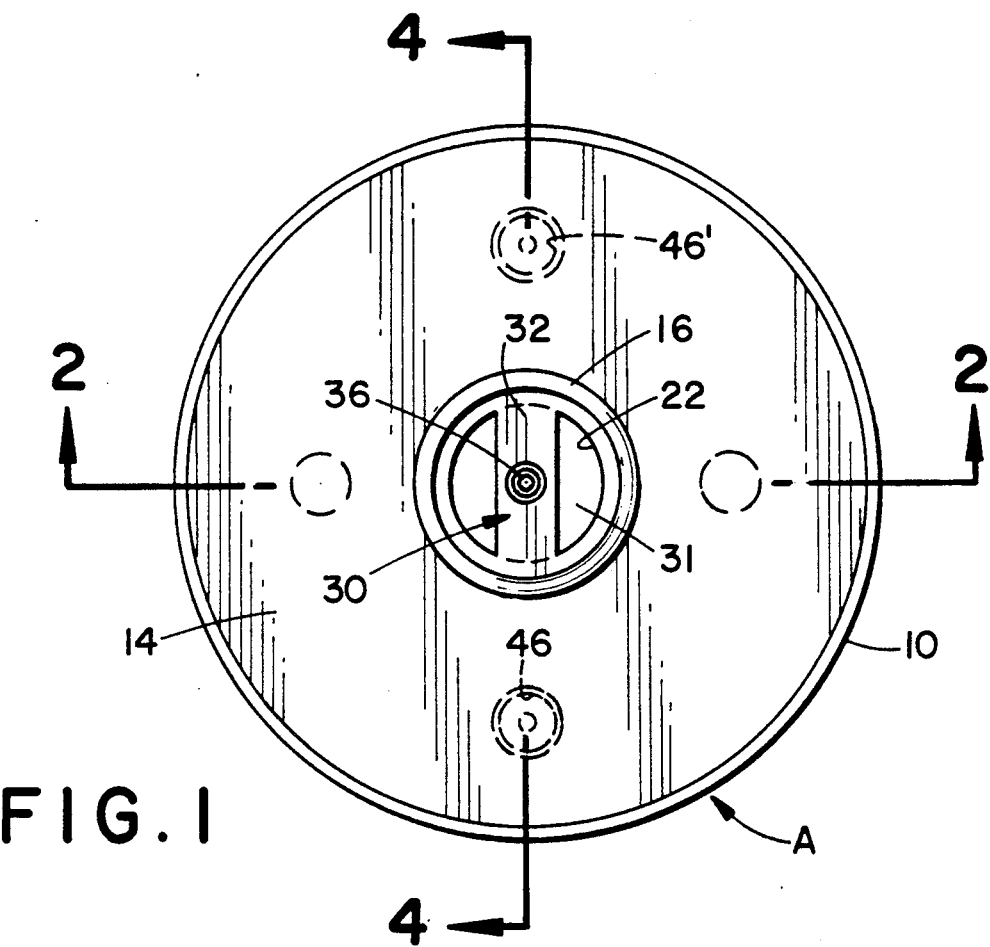
FIG. 1 is an end elevational view of an adaptor body according to a first preferred embodiment of the present invention.

Referring now to the drawings wherein the showings are for purposes of illustrating preferred and alternate embodiments of the invention only and not for purposes of limiting same, FIG. 4 shows the subject new bushing which includes an adaptor body A and may also include an insert body B. It should, however, be recognized that the adaptor body can be used by itself, such as is illustrated for example in FIG. 6 and that the adaptor body can have many different configurations.

Figure 2:
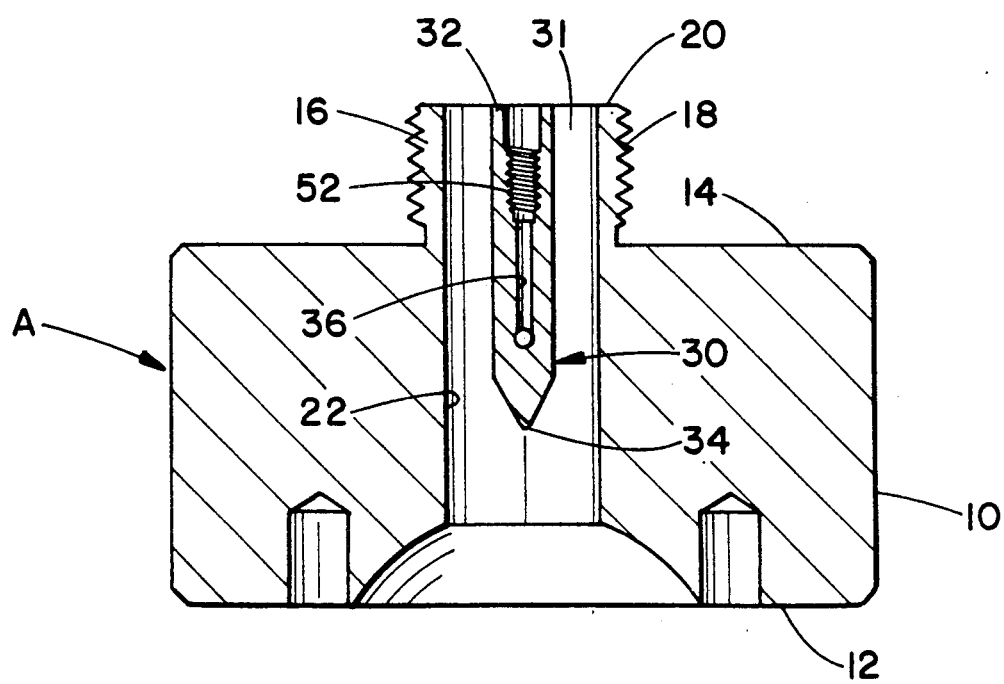
FIG. 2 is a cross sectional view through the adaptor body of FIG. 1 along line 2—2.

More specifically and with reference now also to FIG. 2, the adaptor body A is substantially cylindrical in the embodiment shown, although it could have any other conventional cross-sectional shape as well. The body has a larger diameter first section 10 on which is defined a first or rear end 12 and a second or front end 14. Mounted on the front end 14 is a preferably reduced diameter second section 16 of the body A. Provided on an exterior periphery of the second section 16 is a threaded area 18. The adaptor body A also includes a smooth outer periphery on the first section thereof.

Extending longitudinally through the adaptor body A, substantially along its centerline, from the first section rear end 12 to a second section front end 20 is a bore 22. The bore accommodates a flow of relatively viscous fluid, such as a molten thermoplastic, through the body.

Extending transversely across the bore 22 between opposing walls of the bore and adjacent the adaptor body front end 20 is a bridge 30. Fluid flow is allowed through the first bore around the bridge through semi-circular slots 31 of the bore 22 as is evident from FIG. 1. The bridge 30 has a substantially flat front end 32 and a tapered rear end 34 which terminates in the bore 22 and splits the flow of the molten thermoplastic into the two slots 31. Extending into the bridge 30 from the front surface 32 thereof is a first bore 36 which accommodates a flow of a relatively non-viscous fluid, such as a neutral gas, air or steam. The first bore 36 terminates on the bridge surface in such a manner as to be substantially coaxial with the adaptor body longitudinal bore 22 as best seen in FIG. 1.

With reference now also to FIG. 4, it can be seen that the first bore 36 communicates with a second bore 38 extending approximately normal to the first bore in the adaptor body A. A third bore 40 of substantially larger diameter than the second bore communicates therewith and extends to the outer periphery of the adaptor body first section 10. The third bore includes a threaded section adjacent the adaptor body outer periphery 20 so that it can accommodate a suitably threaded cap 42 thereby closing off the bore 40. Alternatively a fitting can be secured at this point to allow the bore 40 to communicate with a suitable pressurized fluid. Communicating with the third bore 40 is a fourth bore 44 defined in the adaptor body A in a direction normal to the third bore. The fourth bore 44 in turn communicates with a fifth larger diameter bore 46 that extends to the rear end 12 of the adaptor body A.

Preferably the third bore 38 extends away from the second bore 36 in both directions so as to also communicate with sixth, seventh and eighth bores 40′, 44′ and 46′, respectively. In this way, two paths are provided for gas flow to and from the adapter body first section rear face 12.

Located in the adaptor body third bore section 40 is a suitably designed cylindrically shaped filter 50, made of a suitable conventional material for filtering the gas or other relatively non-viscous fluid flowing through the bores 36, 38, 40, 44 and 46. The filter is especially useful during the decompression of gas which is held in the mold cavity during the molding operation in order to prevent the flow back into the gas line of plastic particles which "dust off" the now solidified plastic part when gas is vented from the gas cavity created in the molded part. Thus, the main function of the filter 50 is to filter the gas flowing back out of the mold cavity in order to prevent thermoplastic particles from flowing back into the gas line and eventually clogging the line or a valve positioned in the line.

The air filter can have a porosity such as 60 microns. It preferably also includes at least one aperture 51, which can be on the order of 0.010 inches, thereby allowing a relatively unrestricted inflow of the gas while at the same time restricting outflow of any particles when the gas cavity inside the molded product is depressurized.

Provided in the adaptor body first bore 36 is a threaded area 52 (FIG. 2) which cooperates with a suitable threaded end section 54 of a tube 56 that is secured to the adaptor body A. The tube 56 extends away from the adaptor body A and includes a longitudinally extending through bore 58 which communicates with the first bore 36. In this way, gas is permitted to flow through the first bore 36 and the tube bore 58.

With continuing reference to FIG. 4, an insert body B, which can have a substantially cylindrical shape if desired, is preferably provided adjacent the adaptor body A. The insert body can include a flat first or rear end 60 as well as a bulbous second or front end 62. A longitudinally extending bore 64 of varying diameter extends between the first and second ends. The bore 64 is provided with a threaded section 66 at its rear which is adapted to engage the threaded outer periphery 18 of the adaptor body second section 16 in order to provide a securing means to fasten the adaptor body to the insert body.

The tube 56 preferably extends through the insert body bore 64 to the insert front end 62. The tube is advantageous in order to allow direct communication of one or more relatively non-viscous fluids (e.g., a gas) flowing into the tube and from the bores 36, 38, 40, 44 and 46, as well as 40′, 44′ and 46′ with an associated sprue C positioned adjacent the insert body B. In this way, the gas does not flow into the molten thermoplastic flowing through the insert body bore 64 but rather it communicates with the molten thermoplastic only at the sprue C. This is advantageous in order to insure that the gas flows directly into the middle of the molten thermoplastic material instead of diffusing therein.

With reference now also to FIG. 3, provided in the insert body B is a second bore 72 extending longitudinally therethrough as well as an aperture 74 extending into the adapter from the front end 62 thereof. The locations of the bore 72 and the aperture 74 are best shown in FIG. 3 wherein it can be seen that preferably two such apertures 74 and four such bores 72 are provided. It should be recognized, however, that any other suitable number of such apertures and bores may be provided as desired.

Secured to the insert body B is a layer of a suitable conventional insulation material 80, such as mica. It is advantageous to insulate the bushing from the sprue C, and hence the rest of the mold body, in order to allow an associated mold body D and the sprue C, to fully cool down. This is done by insulating the molten thermoplastic in the heated nozzle (not illustrated), adapter body A and insert body B from the sprue C and the mold body D. Thus the thermoplastic in the mold body and sprue can cool down while the thermoplastic in the nozzle and the bushing (i.e. the adaptor A and insert B) stays molten.

A bore 82 extends through the insulation material 80 in a manner to communicate with the bore 64 of the insert body B thereby allowing molten thermoplastic material to flow therethrough. Also provided in the insulation material is a first aperture 84 for accommodating a fastener 86 that secures the layer of insulation material to the insert body B by extending into and being fastened in the aperture 74 of the insert body B. Extending through the insulation material 80 is a second aperture 88 for accommodating a fastener 90 which secures the insert body B to the sprue C by extending into an aperture 92 of a sprue body 94. Extending longitudinally through the sprue body 94 is a bore 96 which communicates with the insert body bore 64 and hence, the adaptor body longitudinal bore 22. The bores 22, 64, and 96 are coaxial so that molten thermoplastic material can flow entirely through them in a relatively easy fashion. In the meanwhile, gas will enter the sprue bore 96 directly at the front of the bore and will not be mixed with the molten thermoplastic material flowing through the insert body bore 64, as mentioned previously.

The gas which flows through the sprue bore 96 creates a gas cavity 100 in a plastic body or part 102 which is formed in a mold space 104 that is created by cooperation of a pair of mold halves 106 and 108 of the mold body D. As can be seen in FIG. 4, the gas or fluid cavity 100 is formed in a thicker section of the plastic body 102.

The tube 56 is also advantageous for insuring that the exhaust of the gas or fluid from the gas or fluid cavity 100 created in the plastic body 102 will not entrain molten thermoplastic since the mold body D and sprue C will be relatively cool because they are insulated by the mica insulation 80. In contrast, the sprue bushing, that is the adaptor body A and insert body B, will be maintained in a relatively warm state. This is accomplished by suitable heating bands 112 and 114 which can be provided around the exterior peripheries of the adaptor body A and insert body B respectively. Alternatively, heating could be done by way of heater cartridges (not illustrated) which are adapted to be housed in suitable bores (not illustrated) in the adaptor body and insert body.

In this regard, it is advantageous to provide hot gas to the plastic material which is being formed into the plastic part 102 because the heating of the gas where it enters the plastic maintains the thermoplastic in a hot condition. It is disadvantageous to precipitously cool the molten thermoplastic from the center, i.e., by cool gas entering the middle of the molten thermoplastic and forming the gas cavity 100 in the thermoplastic since this will under some circumstances deteriorate the properties of some plastics.

Thus, the heater elements 112 and 114 are advantageous in order to insure that the thermoplastic flowing through the sprue bushing will stay molten, as well as to insure that the gas flowing through the sprue bushing will be heated so as not to cool the thermoplastic. It is also noted that the tube 56 is surrounded by molten thermoplastic thereby further heating the gas before it enters the thermoplastic.

A first fluid line 120 can communicate with the bore 46. The line 120 can lead from a first fluid supply source (not illustrated) with the flow of fluid being controlled by a first valve 122. Also provided is a second fluid line 124 which can communicate with the line 46' and allows fluid to flow from a pressurized second fluid source (not illustrated) as controlled and regulated by a second valve 126. As can be seen from FIG. 4, a number of different fluid flow paths are possible with the apparatus of the present invention.

With reference now to FIG. 5, the tube 56 is there illustrated in an end view to show that at its tip 130, a plurality of spaced smaller diameter apertures 132, 134 can be utilized instead of the relatively larger diameter bore 58 which extends through the tube 56. Such smaller diameter apertures are advantageous in order to restrict the possible inflow of molten thermoplastic back into the tube 56 during the venting of the gas cavity 100 during depressurization.

With reference now to FIG. 6, the use of an adaptor body E in conjunction with a nozzle F, an extension G and a tip H according to an alternate embodiment of the present invention is there illustrated. In this embodiment, the adaptor body E includes a large diameter central section 140 having a first or rear surface 142 on which is defined a reduced diameter rear section 144 and a second or front surface 146, on which is defined a reduced diameter front section 148. The front section 148 is provided with a threaded outer periphery 149 for securing the adaptor body E to the extension F.

The rear surface 142 includes a threaded aperture 150 for accommodating a suitable fastener 151 which extends through a bore 152 provided in a flanged forward section 153 of a housing 154 of the nozzle F.

The housing 154 has a bore 156 extending completely therethrough. Defined at a front end of the bore 156 is an enlarged diameter bore section 158 which houses the adaptor body rear section 144. Adapted to reciprocate in the bore 156 is a valve body 164. The valve body has an enlarged rear end 166 and a front end 168 which is provided with an aperture 170 that extends from a front face 172 of the valve body to an outer periphery 174 thereof at an angle. As illustrated in FIG. 6, a Y-shaped aperture 170 could be provided through the valve body 164, if desired.

The front end 168 of the valve body is accommodated in a suitably enlarged bore 182 defined in the rear section 144 of the adaptor body E. The adaptor body also includes a reduced diameter flange 184 which extends rearwardly from the rear section 144. Extending at an angle through the reduced diameter flange portion 184 is at least one aperture 186. This aperture is adapted to cooperate with the aperture 170 of the valve body 164 when the valve is positioned forwardly in the adaptor body E.

It can be seen that the apertures 170 and 186 in the valve body 164 and the adaptor body E, respectively, are out of alignment when the valve body 164 is at its rearmost location, as is illustrated in FIG. 6. However, when the valve body is in its forwardmost location, the two apertures 170 and 186 are aligned to allow molten thermoplastic to flow therethrough. The thermoplastic then continues to flow through the bore 182 and around a bridge 188 which is identical to the bridge illustrated in the embodiment of FIGS. 1-5.

At least one gap 190 is provided in the valve body enlarged rear end 166 in order to allow molten thermoplastic that flows into the nozzle longitudinal bore 156 to flow around the valve body rear end 166. Also, a spring 192 resiliently biases the valve body 164 away from the adaptor body E until the valve body rear end 166 contacts a wall 194 defining a reduced diameter portion of the bore 156. The spring 192 extends between the valve body rear end 166 and the adaptor body reduced diameter flange 184.

When molten thermoplastic is pressurized, it urges the valve body 164 forward by pushing against the valve body's rear end 166, until the apertures 170 and 186 in the valve body and adaptor body reduced diameter flange 184 are aligned. This allows molten thermoplastic to then flow around the valve body rear end 166, through the gaps 190 thereof, through the bore 156, then through the apertures 186 and 170 and into the adaptor body bore 182.

With reference now also to FIG. 7, the adaptor body E has an outer periphery 202 which may be substantially circular. Extending radially inwardly therefrom is at least one first bore 204 which communicates with a substantially normally extending second bore 206 that extends to a forward surface of the bridge 188. The second bore 206 is provided with a threaded section 208 in order to accommodate one end of a tube 210.

Preferably a suitable filter element 211 is located in the bore 204. Extending in a direction substantially normal to the bore 204 is a third bore 212 which terminates at the rear face 142 of the adaptor body E. Communicating with the third bore 212 is a fourth bore 213 which extends in the nozzle body F in a direction substantially parallel with the nozzle body bore 156. Provided adjacent a rear end of the nozzle body F, and communicating with the fourth bore 213, is a fifth bore 214. In this way, a suitable relatively non-viscous fluid, such as a gas, is adapted to flow through the bores 214, 213, 212, 204, 206 and into the tube 210. In order to ensure that there will not be a leakage of gas between the bores 213 and 212 in the nozzle body F and adaptor body E respectively, a suitable gasket 216 or the like can extend therebetween.

One advantage of providing the bore 213 extending longitudinally through the nozzle body F is that the gas flowing therethrough will be heated by the heat of the nozzle body thereby approaching the temperature at which the molten thermoplastic flows through the nozzle body. It should be noted that the nozzle body is preferably provided with one or more heater bands (not illustrated) along the lines of the heater bands illustrated in FIG. 4.

Preferably, a second series of bores 204', 212', 213', 214' can extend through the adaptor body and nozzle body in order to allow more than one path for the gas to flow.

As mentioned, as extension G is threadedly secured to the adaptor body E. The extension includes a substantially cylindrical body 222 having a longitudinally extending bore 224 therethrough. The tube 210 extends through the bore 224 and is substantially centrally positioned therein. Adapted to be housed in the extension body bore 224 is a suitable spider 226 for centrally locating the tube 210 in the bore 224, as is evident from FIG. 8. The spider 226 is so oriented as to provide suitable flow slots 228 therethrough for the molten thermoplastic material. Provided at a front end of the extension body 222 is a threaded interior periphery 232 which accommodates a reduced diameter exteriorly threaded flange section 234 of the tip H.

The tip further includes a longitudinally extending bore 236 for accommodating a flow of the molten thermoplastic material. It is also noted that the tube 210 is centrally located in the tip bore 236 and extends substantially to a front end 238 of the tip.

As mentioned with regard to the embodiment of FIGS. 1-5, it is advantageous to provide for a tube extending substantially through the nozzle assembly and to the edge of the mold body sprue (not illustrated in this view). The molten thermoplastic flows through the bore 182 in the adaptor body E and through two semi-circular gaps 212, one provided one either side of the island 188 and out through the front section 148 of the adaptor body E. The molten thermoplastic then flows through the bore 224 of the extension G and the bore 236 of the tip H. From there, the thermoplastic flows into the sprue of a mold body (not illustrated).

Either simultaneously therewith, or shortly thereafter, a relatively non-viscous fluid, such as a gas, flows through the bores 214, 213, 212, 204, 206 and into the tube 210. The gas then flows through the tube and emerges at a tip 240 of the tube adjacent the front end 238 of the tip section H.

It is noted that in this embodiment of the invention, the sprue bushing (i.e., the adaptor body E) is not located directly adjacent the sprue, but is spaced therefrom by the extension G and the tip H. Also, in this embodiment, no adaptor body is necessary. Due to the presence of the tube 210, the gas is heated to approach the temperature of the molten thermoplastic thereby enhancing the effectiveness of the injection molding process because the gas, when it does enter the molten thermoplastic, does not serve to significantly cool the center of the molten thermoplastic material. Additionally, during venting, the gas which flows out of the gas cavity created in the plastic body formed in the mold cavity will flow directly back into the gas channels of the assembly without entraining significant amounts molten thermoplastic material. As mentioned, the thermoplastic material in the nozzle is still molten and would clog the gas flow channels in the assembly if it were to flow back with the gas.

When decompression is desired, and gas flow begins through the tube 210, pressurized gas is allowed to flow through the aperture 204 defined in the adaptor body E and out of the nozzle area. However, because of the presence of the tube 210, it is unlikely that any molten thermoplastic material will at the same time be allowed to flow through the gas channels.

The invention has been described with reference to preferred and alternate embodiments. Obviously, modifications and alterations will occur to others upon a reading and understanding of this specification. It is intended to include all such modifications and alterations insofar as they come within the scope of the appended claims or the equivalents thereof.

What is claimed is:

1. A bushing used in an injection molding machine and positioned between a nozzle and a sprue body, comprising:
    an adaptor body having a longitudinal axis, a fist end and a second end;
    a first bore which extends in said adaptor body parallel to said longitudinal axis from said second end to said first end of said body for accommodating a flow of a viscous fluid;
    a bridge extending transversely across said first bore between opposing walls of said first bore adjacent said adaptor body first end, fluid flow of said viscous fluid being allowed through said first bore around said bridge;
    a second bore having a first end located on a surface of said adaptor body and extending to a second end located on a surface of said bridge, said second bore accommodating a flow of a non-viscous fluid, said second bore second end being substantially coaxial with said first bore; and,
    a third bore having a first end located on a surface of said adaptor body in spaced relation to said second bore first end and extending to a second end communicating with said second bore.

2. The bushing of claim 1 further comprising a tube secured at one end to said adaptor body bridge and extending away therefrom said tube being in fluid communication with said second bore.

3. The bushing of claim 1 further comprising an insulating means for insulating said adaptor body first end from an associated sprue.

4. The bushing of claim 1 further comprising a filter located in said second bore for filtering the non-viscous fluid.

5. The bushing of claim 1 further comprising an insert body having a first end and a second end, which is secured to said adaptor body first end, a fourth bore extending longitudinally through said insert body, said fourth bore being in fluid communication with said adaptor body first bore.

6. The bushing of claim 5 further comprising a tube secured at one end to said adaptor body bridge section and extending through said insert body fourth bore, said tube being in fluid communication with said second bore.

7. The bushing of claim 5 further comprising a fastener for securing said insert body to said sprue body.

8. A bushing used in an injection molding machine and adapted to be positioned between a sprue body and a nozzle thereof, the bushing comprising:
    an adaptor body having a longitudinal axis, a front end, a rear end and an exterior periphery, said adaptor body comprising:
        a first bore which extends parallel to said longitudinal axis from said rear end to said front end for accommodating a viscous fluid,
        a bridge extending transversely across said first bore between opposing walls of said bore adjacent said body front end, fluid flow of said viscous fluid being allowed through said first bore around said bridge, and
        a second bore which extends from a surface of said bridge to said body exterior periphery for accommodating a flow of a non-viscous fluid;
    an insert body having a front end and a rear end, a third bore extending longitudinally through said insert body, said third bore being in fluid communication with said first bore; and, a securing means for securing said insert body rear end to said adaptor body front end.

9. The bushing of claim 8 further comprising a tube having one end secured to said adaptor body front end and extending through said third bore.

10. The bushing of claim 8 further comprising a layer of a thermally insulating material for insulating said adaptor body and said insert body from said sprue body.

11. The bushing of claim 8 further comprising a filter located in said second bore for filtering the non-viscous fluid.

12. The bushing of claim 8 wherein said adaptor body is substantially cylindrical in shape and includes a reduced diameter front section and wherein said securing means comprises a threaded outer periphery provided on said reduced diameter front section for cooperating with a suitably threaded inner periphery of said third bore at a rear section of said insert body.

13. A bushing used in an injection molding machine and positioned between a nozzle and a sprue, comprising:

a body having a longitudinal axis, a front end, a rear end and an exterior periphery:

a first bore which extends parallel to said longitudinal axis from said rear end to said front end of said body for accommodating a viscous fluid;

a bridge extending transversely across said first bore between opposing walls of said bore adjacent said body first end, fluid flow of said viscous fluid being allowed in said first bore around said bridge;

a second bore which extends in said bridge and in said body for accommodating a non-viscous fluid, said second bore terminating adjacent said body front end; and, a tube having a first end and a second end, said tube first end being secured to said body front end and said tube extending away therefrom such that said tube second end is located forwardly of said body, said tube having a through bore which is in fluid communication with said second bore.

14. The bushing of claim 13 further comprising a cylinder which is secured to said body front end, said cylinder having a through bore which is in fluid communication with said body first bore, and wherein said tube extends in said cylinder through bore.

15. The bushing of claim 14 further comprising a spider located in said cylinder for supporting said tube in said cylinder through bore.

16. The bushing of claim 13 wherein said body further comprises a third bore which extends from an outer periphery of said body and is in fluid communication with said second bore.

17. The bushing of claim 16 wherein said body second bore includes a first section which extends radially inwardly from an outer periphery of said body and a second section which extends substantially along said body longitudinal axis and terminates at a front end of said bridge, and wherein said third bore extends radially inwardly from said body outer periphery in a spaced manner from said second bore first section, said third bore communicating with said second bore second section.

18. The bushing of claim 13 further comprising a filter located in said adaptor body second bore.

19. The bushing of claim 18 wherein said filter includes at least one bore which extends longitudinally through said filter to provide an unfiltered flow path.

20. A nozzle for an injection molding machine comprising:

a nozzle body having a longitudinal axis, an inlet end, a discharge end and a flow passage for a viscous first fluid, said flow passage extending along said longitudinal axis from said inlet end to said discharge end;

a valve element mounted for reciprocation in said nozzle body flow passage to control a flow of the first fluid through said nozzle body discharge end;

an adapter body having a rear end secured to said nozzle body discharge end, and a front end, said adapter body comprising:

a first bore which extends longitudinally in said adapter body from said rear end to said front end of said body, said first bore being in fluid communication with said nozzle body flow passage to accommodate a flow of said first fluid, a bridge extending transversely across said first bore between opposing walls of said bore adjacent said adapter body front end, flow of said first fluid being allowed through said first bore around said bridge, and a second bore which extends from a surface of said bridge to an outer periphery of said adapter body for accommodating a flow of a non-viscous fluid, said second bore terminating in said bridge so as to be coaxial with said first bore, said second bore communicating with a third bore which extends in said nozzle body; and, a seal element positioned between said nozzle body and said adapter body to prevent fluid leaks between said second bore and said third bore.

* * * * *